United States Patent [19]
Aubry et al.

[11] Patent Number: 4,768,630
[45] Date of Patent: Sep. 6, 1988

[54] ROTARY DAMPER

[75] Inventors: Jacques Aubry, Cabries; Michel Deguise, Mallemort, both of France

[73] Assignee: Aerospatiale Societe Nationale Industrielle, Paris, France

[21] Appl. No.: 946,070

[22] Filed: Dec. 24, 1986

[30] Foreign Application Priority Data

Dec. 30, 1985 [FR] France ................. 85 19418

[51] Int. Cl.⁴ .................. F16F 9/14; B60G 13/08
[52] U.S. Cl. ..................... 188/290; 188/296; 188/307; 188/276; 192/3.21
[58] Field of Search ............. 188/306, 307, 308, 309, 188/310, 290, 292, 293, 294, 296, 298, 276; 192/3.21, 3.22, 3.23

[56] References Cited

U.S. PATENT DOCUMENTS

| | | | |
|---|---|---|---|
| 1,068,329 | 7/1913 | Derihon | 188/309 |
| 2,027,423 | 1/1936 | Gardiner | 188/308 X |
| 2,618,370 | 11/1952 | Orwin | 188/290 |
| 3,107,752 | 10/1963 | McLean | 188/87 |
| 3,274,836 | 9/1966 | Nash | 74/574 |
| 4,527,675 | 7/1985 | Omata et al. | 188/290 |

FOREIGN PATENT DOCUMENTS 2256347  1/1974  France .

Primary Examiner—George E. A. Halvosa
Assistant Examiner—Matthew E. Graham
Attorney, Agent, or Firm—Fisher, Christen & Sabol

[57] ABSTRACT

A rotary damper comprises a stator and a rotor which are co-axial, circular and cylindrical, two extreme faces substantialy transversal to the axis of the stator and rotor and disposed respectively on either side of the stator and rotor, a main chamber filled with a fluid, defined between the extreme faces and the stator and the rotor, blades disposed on the stator and rotor and dividing the main chamber is a plurality of volumes, the blades laminating the flow of fluid through the different volumes of the main chamber, and an auxiliary chamber which communicates with the main chamber. The auxiliary chamber is at least partly formed by a diaphragm which is elastically deformable and which is designed to compensate for the volume variations of the fluid as a function of its temperature, and to bring in, if necessary, a twisting stiffness in parallel to the damping function. The rotary damper finds application for example in vehicle suspensions.

14 Claims, 6 Drawing Sheets

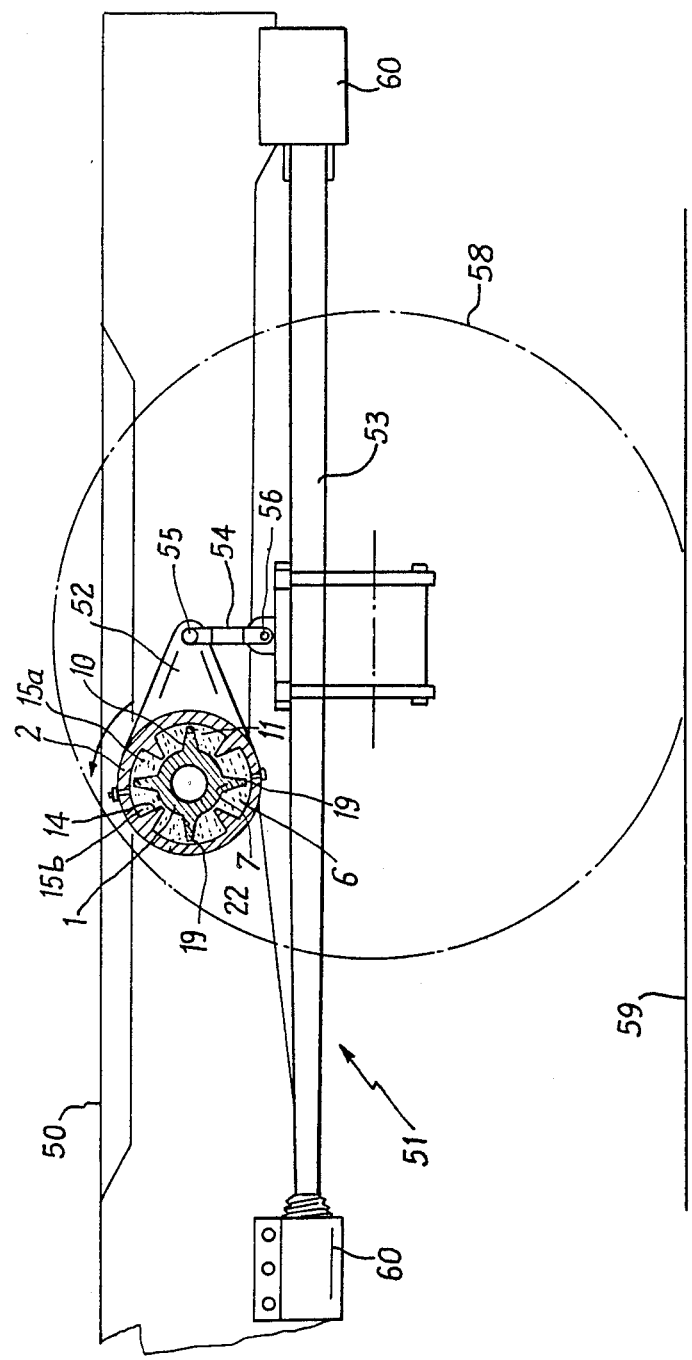

ROTARY DAMPER

The present invention relates to a rotary damper for installation between a fixed part and a mobile part of a mechanism, and in particular to a suspension for vehicle comprising at least one damper of this type.

Heretofore known dampers comprise a stator and a rotor defining between them a chamber filled with fluid, blades which are at least substantially radial being disposed on each of said stator and rotor, the blades disposed on the stator, respectively the rotor, dividing said chamber into a plurality of volumes, and the free ends of the blades disposed on the rotor, respectively the stator, defining laminating passages, in cooperation with cylindrical portions, in facing relationship, of the surface contained between two blades of the stator, respectively the rotor.

Said known dampers give satisfactory results and are used, for example, in the suspensions of heavy vehicles, the controls of vehicles steerings, machine-tools with reversible directions of rotation, etc.

In the case of a suspension, the rotor is coupled to the vehicle wheel via an arm of the suspension, and the stator is integral with the vehicle chassis. When the wheel rolls over an obstacle, the arm of the suspension transmit the displacement of the wheel to the rotor, this causing the rotation of the associated blades and the transfer of the viscous fluid through the volumes via the laminating passages, thus ensuring the damping.

However, during the repeated functioning of these dampers, the total volume of the viscous fluis varies as a function of the temperature. When this rises, the fluid expands and occupies a greater volume. On the contrary, when the temperature goes down, the fluid becomes more compact and occupies a smaller volume.

As a consequence, there is a risk that the internal chamber of these dampers is not filled with an optimum quantity of fluid, which will reduce the efficiency of the dampers and cause jerks in the functioning, due notably to the presence of air inside the chamber. In an attempt to overcome this drawback, a rotary damper has been proposed, for example in the document FR-A-No. 2 256 347, which comprises an auxiliary chamber which communicates with the main internal chamber by way of orifices provided in the lid of the damper. Said auxiliary chamber is defined by the extension of a housing of the staor, the lid and a piston adapted to slide inside said housing.

Thus, when the volume of the fluid increases appreciably, it passes from the main chamber into the auxiliary chamber through said orifices, moving the piston of a sufficient quantity to compensate for the variation in the volume of the fluid. When the fluid temperature goes down, this resulting in a reduction of the volume, the piston delivers the fluid from the auxiliary chamber towards the main chamber under the action of elastic means. The piston delivery pressure must always be above the damper working pressure. Such damper gives good results, but it is complex and expensive to produce because of having to provide a housing for receiving a piston equipped with mechanical packings and elastic return means. Moreover, the use of such packings necessitates a maintenance in order to control the good working of the assembly.

Moreover, the piston displacement is not immediate since the pressure exerted on the fluid has to overcome the friction forces created between the packings and their respective contact surfaces.

It is the object of the present invention to propose a rotary damper which overcomes the aforesaid drawbacks and which is of simple design, with an auxiliary chamber without any mechanical packing, thus eliminating the need for any maintenance.

The invention proposes to this effect a rotary damper, of the type comprising a stator and a rotor defining between them a main chamber filled with a fluid, at least substantially radial blades being disposed on each one of said stator and rotor, the blades disposed on the stator, respectively the rotor, dividing said main chamber into a plurality of volumes, and the free ends of the blades disposed on the rotor, respectively the stator, defining laminating passages in cooperation with portions, in facing relationship, of the surface contained between two blades of the stator, respectively the rotor, said damper further comprising an auxiliary chamber communicating with the main chamber, which rotary damper is noteworthy in that said auxiliary chamber is formed by at least one enclosure defined between, on the one hand, an extreme face of said damper and, on the other hand, an elastically deformable diaphragm associated to said extreme face.

Preferably said auxiliary chamber is formed by two enclosures, each one of which is defined between, on the one hand, one of said extreme faces of said damper, and on the other hand, an elastically deformable diaphragm associated to the corresponding extreme face. Advantageously, an extreme face associated to a diaphragm is constituted of two discs, respectively associated to said stator and to said rotor, said communication passage between the main chamber and the auxiliary chamber being formed by a clearance provided between said discs.

The said diaphragm of an auxiliary chamber may be annular shaped.

And advantageously, the external and internal annular peripheries of a diaphragm are encircled by an internal ring and anexternal ring. Said diaphragm may be secured by vulcanization on its respective internal and external rings, whereas said diaphragm encircled by said external and internal rings, is housed in a corresponding annular groove defined by said discs.

It is, moreover, possible with the present invention to overcome the drawback whereby the laminating remains constant whatever the extent of the relative rotation between rotor and stator, namely, in the case for example of an application to a suspension, whatever the vehicle load.

To this end, the rotary damper according to the invention, is noteworthy in that the cross-sectional area of each laminating passage is variable as a function of the relative rotation between rotor and stator. For example, said area is all the smaller that the relative rotation between said rotor and stator, in the damping direction, is greater.

Then, in this last embodiment, the greater the relative rotation between the rotor and the stator, the greater the laminating of the fluid, and as a result the slowing down of said fluid.

Although other possibilities can be envisaged, it is particularly advantageous according to the invention, if the distance between the free ends of the blades disposed on the rotor, and respectively on the stator, and the portions, in facing relationship, of the surface contained between two blades of the stator, and respectively of the rotor, is all the smaller or greater that the relative rotation between said rotor and stator, in the damping direction, is greater.

A particularly simple way of obtaining said variation of distance, when the stator and rotor are co-axial, consists in that at least part of each portion of said surface is cylindrical and eccentric with respect to the common axis of said rotor and stator.

In particular, the centers of curvature of the sections of said cylindrical portions of said surface by a plane transversal to said portions of surface are situated on a circle, of which the center belongs to the common axis of said rotor and stator, said centers of curvature being regularly spaced out on said circle.

According to one particular embodiment, in which four blades are fixed on the rotor and four blades are fixed on the stator, the said centers of curvature are disposed in quadrature.

If more particularly, the stator is situated inside the rotor and each laminating passage is defined between the free end of a blade situated on the stator and a cylindrical portion, in facing relationship, of the surface betwen two blades of the rotor then, according to the invention, the center of curvature of the section of each cylindrical portion by a plane transversal to said portion is situated on the line joining the ends of the blades of the stator each of which is adjacent to the blade of the stator whose free end defines, with said cylindrical portion, a laminating passage.

The application of the damper according to the invention are varied, and two particular examples adapted respectively to vehicle suspensions and to the flying controls of an aircraft, are described hereinafter, with reference to the accompanying drawings, in which.

Figure 1:
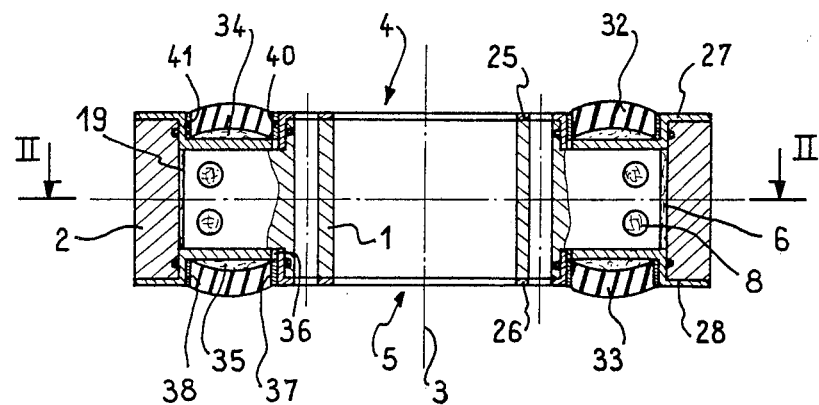
FIG. 1 is an axial cross-section of one embodiment of the damper according to the invention.
Figure 2:
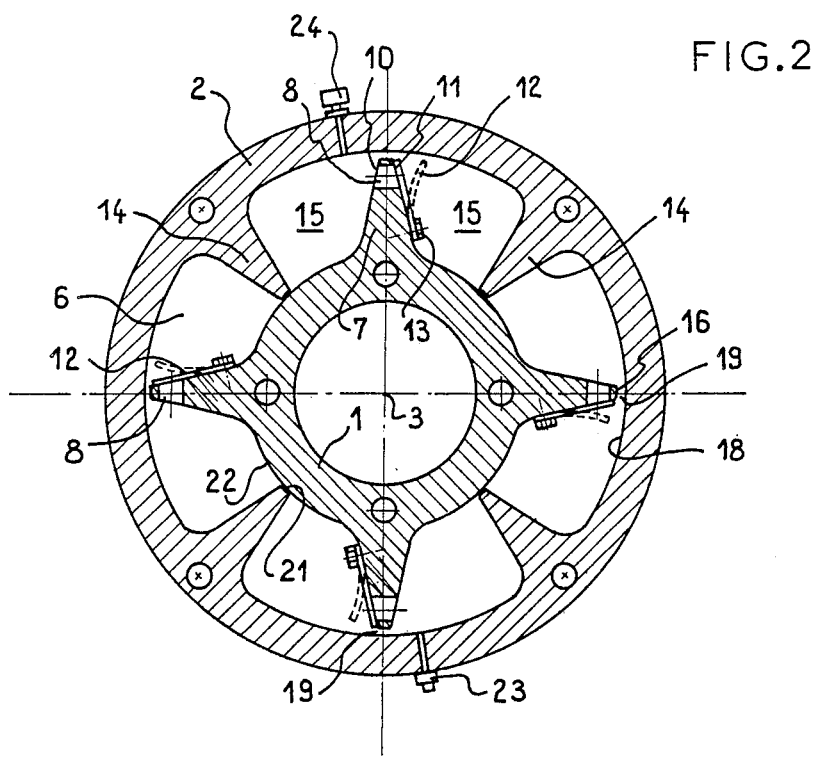
FIG. 2 is a cross-sectional view along line II—II of FIG. 1.
Figure 3:
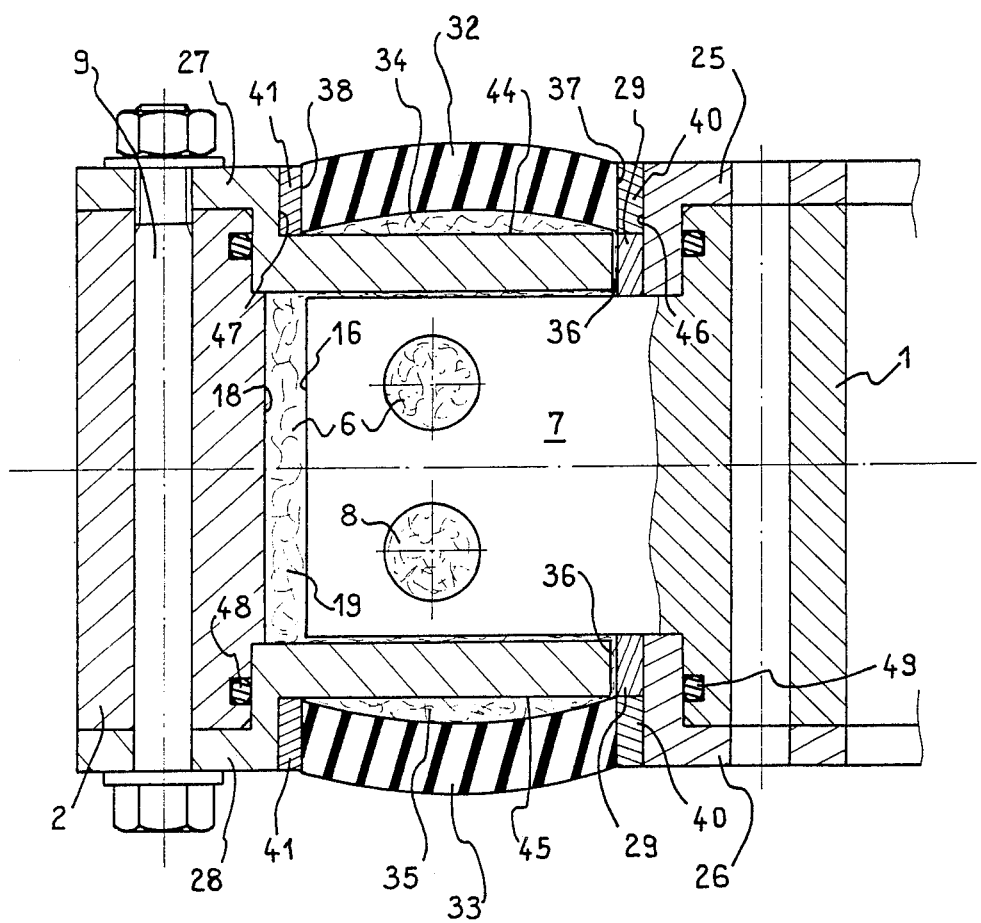
FIG. 3 is a partial enlarged view of FIG. 1.
Figure 4:
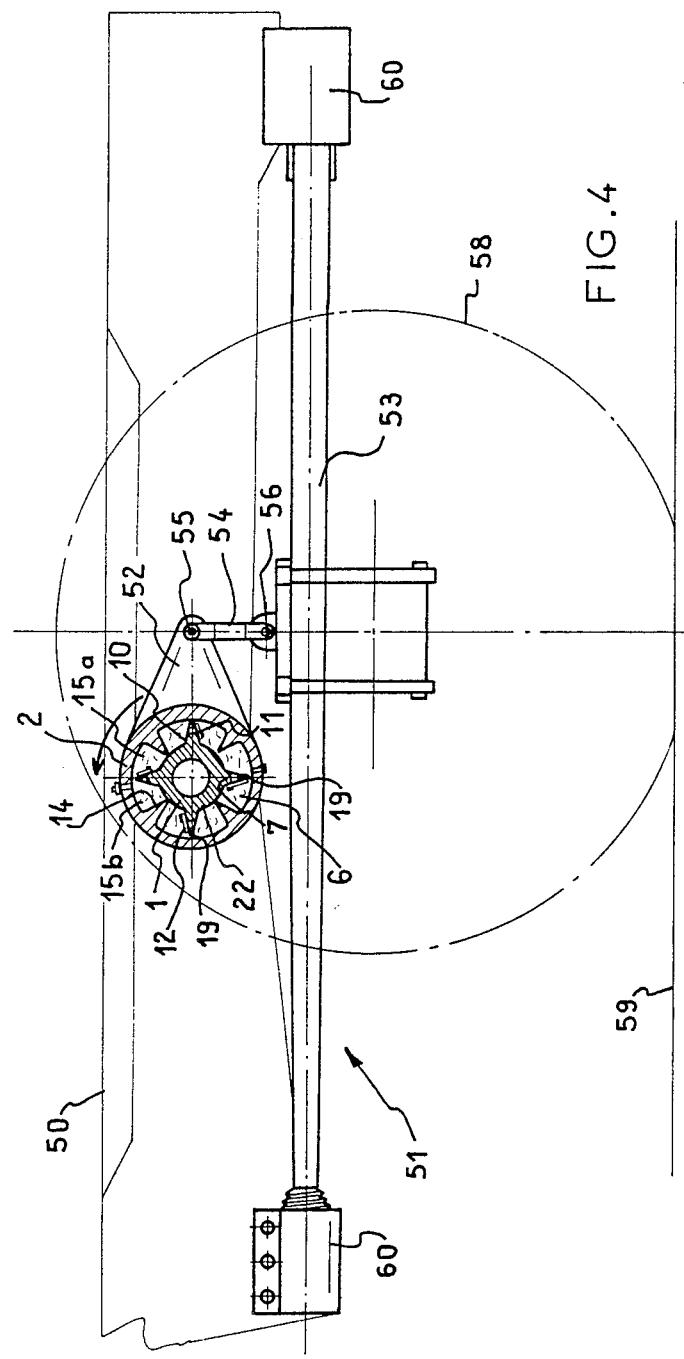

FIG. 4 diagrammatically illustrates one application of the damper of FIGS. 1 to 3 in a vehicle suspension.

Figure 5:
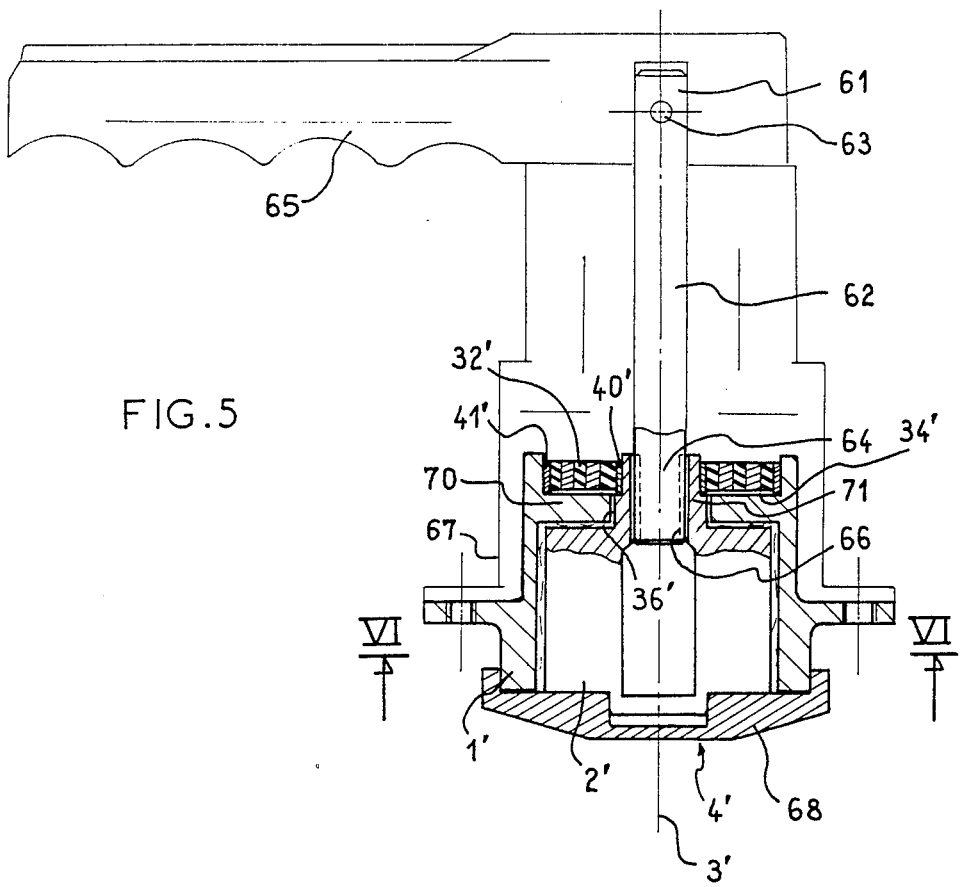
Figure 6:
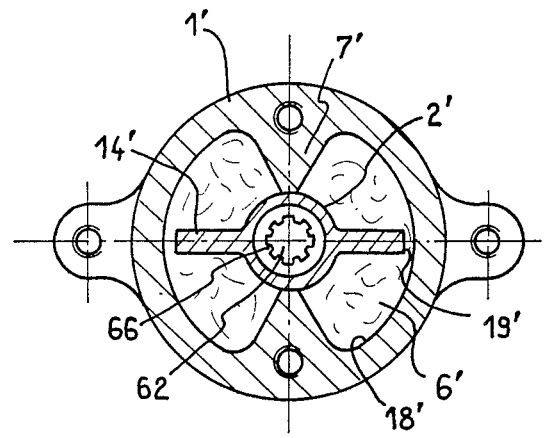

FIGS. 5 and 6 diagrammatically show another embodiment of the damper according to the invention, applied to an aircraft flying control.

Figure 7:
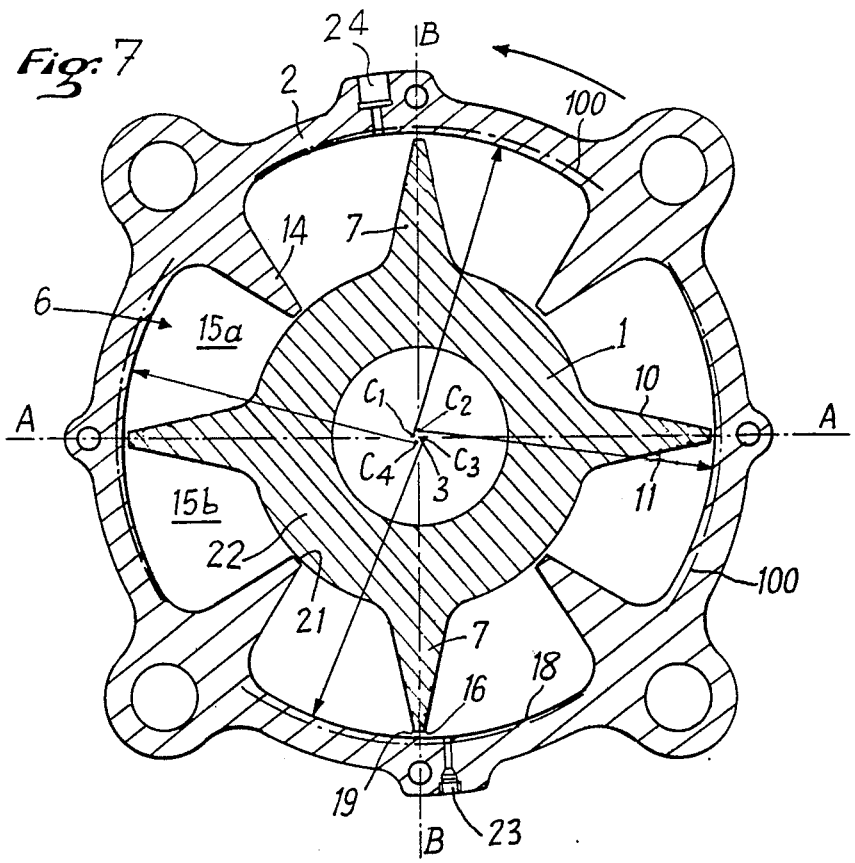
Figure 8:
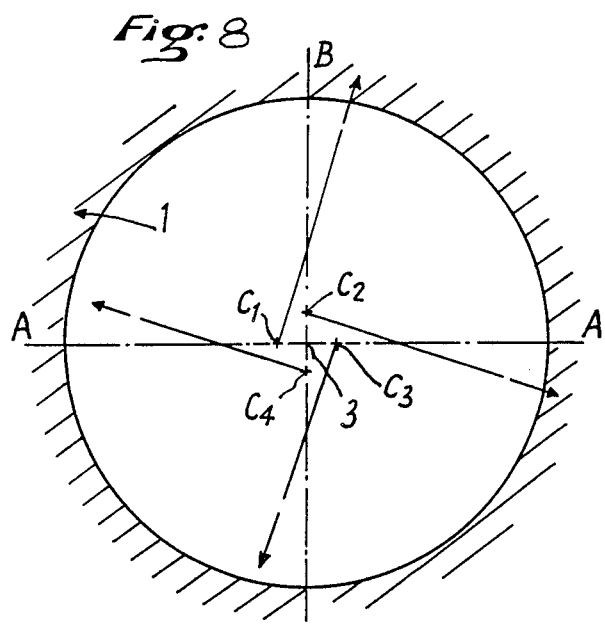

FIGS. 7 and 8 illustrate a variant embodiment of the damper shown in FIGS. 1 to 3.

FIG. 9 illustrates the application of the damper according to FIGS. 7 and 8 to the suspension of FIG. 4.

In these figures, like references designate like elements.

The rotary damper illustrated in FIGS. 1 to 3 comprises a stator 1 of circular cylindrical external shape and a rotor 2 of circular cylindrical internal shape, coaxially mounted on a rotation axis 3, closed on both sides by two extreme faces 4 and 5 disposed transversely to axis 3, and assembled by bolts 9 (shown in FIG. 3) traversing the stator and rotor.

A main chamber 6 is thus defined between the two faces 4 and 5, the stator and rotor; said chamber 6 is filled with a high viscosity fluid, such as silicon oil.

The stator 1 comprises a plurality of radial blades 7 distributed regularly around rotation axis 3 and perforated with orifices 8 creating a communication between the two sides 10 and 11 of each blade 7. Fluid unidirectional transfer means are provided on the side 11 of each blade and are constituted by a spring rod 2 secured by way of a screw 13 on said blades 7.

Similarly, the rotor 2 also comprises a plurality of radial blades 14 regularly distributed around axis 3. In the illustrated example, the stator and rotor comprise four blades each, respectively disposed at 90° one from the other. In the damper static position, each blade 14 of the rotor is in a median position between two adjacent blades 7 of the stator.

The main chamber 6 is thus divided into a plurality of volumes 15 (8 in the illustrated case) which are filled with fluid.

A fluid laminating passage 19 is provided between the end 16 of each blade 7 of the stator and the circular cylindrical internal wall 18 of the rotor 2. Said calibrated internal passages 19 allow a laminar flow of the fluid in the two direction of rotation, through the different volumes 15. On the contrary, the end 21 of the blades 14 of the rotor, is substantially in slight friction contact with the circular cylindrical wall forming the shaft 22 of the stator limiting the passage of the fluid to a very low value.

In addition, the rotor in this particular embodiment, is equipped with a valve 23 filling the main chamber 6 with viscous fluid, and with a discharge valve 24, both of which are diametrically opposite.

Advantageously, the extreme faces 4 and 5 are each constituted of a first disc, respectively 25, 26, fixed by bolts 9 to the stator 1 and of a second disc, 27, 28 respectively, fixed by bolts 9 to the rotor 2.

A self-lubricated bearing 29 is disposed between the first disc and the second disc of each face. An elastically deformable diaphragm 32, 33 is fitted on each extreme face. More specifically, the diaphragms 32,33 have an annular shape of substantially rectangular cross-section. They are produced in elastomer or in a succession of different metallic layers, placed alternatively. Other forms and embodiments could also be suitable.

The annular shape of thse diaphragms determine two peripheries, an internal one 37 and an external one 38, which are respectively encircled by an internal ring 40 and by an external ring 41 on which they are adhesively bonded.

Thus, each diaphragm 32,33 encircled by its rings 40, 41 is housed in a corresponding annular groove, which is defined by the two discs 25,27 and 26,28 of each face. Advantageously, the internal ring 40 and external ring 41 of each diaphragm are bonded to the side walls 46, 47 of the grooves 44, 45.

The volumes respectively defined between each diaphragm 32, 33 and each groove 44, 45 define two auxiliary chambers 34, 35 which communicate with the main chamber 6 by a functional clearance 36 provided between the two rings 25 and 27, on the one hand, and 26 and 28 on the other hand, respectively forming the grooves 44 and 45 of each extreme face, more specifically of each side of the bearing 29 separating the two discs. (The clearance 36 is illustrated in an enlarged scale in FIG. 3). The value of this clearance is determined so as to act as dynamic filter at the operating frequency of the damper, in order to overcome a return force on the diaphragm which is greater than the damper operating pressure.

Clearly, according to the invention, it is possible with said auxiliary chambers 34,35 to compensate for the variations in volume of the viscous fluid as a function of its operating temperature thanks to the elastically deformable diaphragms 32,33. Said diaphragms, which are respectively joined to the stator and rotor via the internal and external rings, undergo twisting stresses during the movement of the rotor with respect to the stator. The nature of the material of said membranes enables the angular deflection of the rotor blades with respect to the stator blades, without said diaphragms being deteriorated.

Advantageously, the layers which constitute the diaphragms are arranged in parallel with respect to the rotation axis of the damper so that they progressively follow the deformations due to twisting.

Also, the damper, because of its design, is completely tight, since the bonding of the diaphragms on the discs of each face ensures tightness of the auxiliary chambers 34,35, and since two O-rings 48,49 disposed respectively on each face, inside a groove provided in the rotor 2 opposite the first disc, ensure tightness of the main chamber 6.

The damper described hereinabove is particularly advantageous, compared to the prior art dampers, in that no mechanical packing is used, this preventing any leaks through wear in the latter while in use.

The functioning of the damper according to the invention is described hereinafter, particularly with reference to FIG. 4 which diagrammatically illustrates an application of said damper to the suspension of a vehicle such as a towing vehicle.

Beforehand, the fluid introduced into the damper, of the silicone oil type because of its viscous characteristics, is injected at a pressure sufficient for the elastic deformation of the diaphragms 32,33 to cover the fluid volume withdrawal, during use at low temperature. As a result, the diaphragms of the damper auxiliary chambers are inflated.

FIG. 4 illustrates the damper mounted by means of the shaft 22 of stator 1 on the chassis 50 of the towing vehicle 51, and by means of an eccentric part 52 of rotor 2 on a suspension element or arm 53 via a rigid connecting rod 54. More specifically, the two ends of the connecting rod 54 are respectively articulated about an axis 55 on the eccentric part 52 and about an axis 56 on the suspension element 53, which carries one or more wheels 58 in contact with the ground 59. The ends of the element 53 are held in two bearings 60 integral with the chassis.

When the wheel 58 encounters an obstacle such as for example a boss, the displacement of the wheel causes that of the suspension element 53 and of the connecting rod 54 via the axial connection 56, this causing, via the axial connection 55, the rotation of rotor 2 about axis 3 in anti-clockwise direction as indicated by the arrow.

The viscous fluid is then transferred from one volume to the other, more precisely from a volume 15a defined by the blades 14 of the rotor and the sides 11 of the blades 7 of the stator, towards a volume 15b defined between the sides 10 of the blades 7 of the stator and the blades 14 of the rotor. The transfer of the fluid is effected through calibrated laminating passages 19 which ensure an adequate laminating of the fluid, hence a slowing down of said fluid between the different volumes 15a, 15b, thus absorbing the energy produced by the shock in the pressure reduction direction.

When the wheel goes over an obstacle, in the compression direction, the rotor 2 thus moves in clockwise direction and the transfer of the fluid is mainly effected through the communication holes 8 between the volumes 15b and 15a, the spring rods 12 (as illustrated in broken lines in FIG. 2) opening under the action of the fluid. The flow of fluid to which is added that going through the laminar passages 19, is then important, which enables a displacement of the wheel in order to absorb the shock.

The successive passage of the wheels of the towing vehicle over obstacles due to undulating grounds entails an overheating of the fluid contained in the dampers. Said fluid expands and then occupies a larger volume. The auxiliary chambers 34, 35, which communicate with the main chamber 6 by means of functional clearance 36, then start playing their part. The increase in volume of the fluid is compensated by the elastic deformation of the diaphragms 32,33 of the auxiliary chambers 34,35.

Said diaphragms, which are subjected to twisting forces, only suffer the static pressure of the fluid, the dynamic pressure being filtered through the functional clearance 36 during the movement of the damper.

In addition, the diaphragms participate in returning the pressures inside the damper to a balanced position. Said diaphragms can also be used, if necessary, to bring on the rotary shaft, a twisting elastic return movement in parallel with the damping function of the rotary movement.

Similarly, during the retraction of the volume of the fluid contained in the damper, the latter being priorly loaded in order to compensate for the fluid volume retraction, the reserve of fluid thus stored in the two auxiliary chambers enables, during the fliuid volume retraction in the main chamber, the injection through clearance 36, of the fluid into the main chamber, while keeping said clearance constantly filled with fluid.

Another example of application of the invention is illustrated in FIGS. 5,6 which show in particular an aircraft flight control, adapted for example, for the orientation, by way of an electric jack, of the front twin wheel assembly of the tricycle landing gear of the helicopter.

The control itself is constituted of a handle 65 fast with a first end 61 of a shaft 62 by means a pin 63. Shaft 62 is fast, via a device not shown, with a potentiometer of the deflection angle, via an electric motor of the twin wheel assembly of the helicopter tricycle landing gear in order to be able to steer the latter after landing. The second end 64 receives the damper according to the invention shown in block line. The embodiment thereof differs from the previous one, while remaining within the scope of the invention. Indeed, the rotor which envelops the stator in the preceding application, is placed inside the stator. The rotor 2 is disposed around the second end of shaft 62 via grooves 66 and the stator 1', which is co-axial to the rotor, is fixed on a support 67 of the flying control. The rotor 2' comprises two blades 14' capable of pivoting about an axis 3' of the shaft 62 under the action of a displacement of the handle 65 by the pilot. The stator 1' encircles the rotor 2' and comprises also two blades 7' and a calibrated laminary passage 19' is provided between the ends of the blades 14' of the rotor and the internal bore 18' of the stator in order to ensure the laminating of the fluid contained in the main chamber 6'. One extreme face 4' is defined by a plug 68 which is tightly fixed on the stator via a flat joint. The second extreme face 5' is itself defined by a shoulder 70 of the stator encircling the part 71 of the rotor mounted on the grooves 66. A clearance 36' is thus created between the shoulder 70 and the part 71 of the rotor which causes the main chamber 6' to communicate with auxiliary chamber 34'. The elastically deformable diaphragm 32' is bound by two inner 40' and outer 41' rings, bonded as described with reference to FIGS. 1 to 3, on the stator and rotor, ensuring total tightness without any mechanical packing, of the chamber 34'. Advantageously, the different layers of the diaphragm (layers of elastomer and metallic layers) are disposed in alternate manner one with respect to the other and are arranged in parallel to the rotation axis 3'. By moduting the number of layers as well as their nature, it is possible to obtain various angular stiffnesses of the damper under twisting forces.

This design is filled with fluid by closing the plug 68 when the damper is totally immersed in a fluid bath. Functioning is identical to that described hereinabove, and one particular object of this damper is to use the laminating of the viscous fluid through the different volumes of the main chamber, in order to reduce the deflection speed controlled by the pilot and thus to reduce the risks of lateral capsizing of the helicopter when the latter is taxiing.

Auxiliary chamber 34' makes it possible to compensate for the thermal expansion of the fluid inside the main chamber due essentially to the sudden variations of the outside temperature to which the aircraft is subjected.

The damper according to the invention could be produced differently, for example as far as the number and profile of the blades and the laminating means are concerned, without departing from the scope of the invention.

The advantages procured by said damper are determinant over those of the prior art.

The damper is completely tight since no mechanical joint has to be used, it compensates for the thermal expansions of the viscous fluid by the axial deformation of the elastic diaphragm, and the angular resistance to twisting stresses of the damper is modulable as a function of its use.

Moreover, the damper is very simple and very economical to produce and maintenance during operation requires virtually no intervention from anyone.

The rotary damper shown in FIG. 7 comprises a stator of circular cylindrical external shape and a rotor 2, both mounted co-axially about a rotation axis 3 (the stator 1 being inside the rotor 2), and closed transversely to axis 3.

A chamber 6 is thus defined between said stator 1 and rotor 2; said chamber 6 being filled with a high viscosity fluid, such as silicone oil.

Stator 1 comprises a plurality of radial blades 7 which are regularly distributed about rotation axis 3 each blade having two sides 10 and 11.

Similarly, rotor 2 comprises a plurality of radial blades 14 regularly distributed about axis 3. In the illustrated example, stator 1 and rotor 2 each comprise four blades disposed respectively at 90° one from the other. In static position of the damper, each blade 14 of the rotor 2 is in a median position between two adjacent blades 7 of the stator 1, or, in other words, each blade 7 of the stator is in a median position between two adjacent blades 14 of the rotor 2.

The main chamber 6 is thus divided into a plurality of volumes 15a, 15b (eight in the illustrated example) which are filled with fluid.

The end 21 of each blade 14 of the rotor 2 is substantially in slight friction contact with the circular cylindrical wall forming the shaft 22 of the stator 1, thus limiting the passage of the fluid in that area to a very small value.

On the other hand, a laminating passage 19 is provided between the free end 16 of each blade 7 of the stator 1 and the facing cylindrical portion of the surface 18 included between two blades 14 of the rotor 2. Said laminating passages 19 allow a laminar flow of fluid in the two directions of rotation, through the different volumes 15a, 15b.

According to the invention, the cross-sectional surface of each laminating passage 19, and in particular, in this embodiment, the distance between the free ends 16 of the blades 7 of the stator 1 and the cylindrical portions, in facing relationship, of the surface 18 included between two blades 14 of the rotor 2, are that smaller that the relative rotation between rotor 2 and stator 1 in the damping direction, is greater.

To this effect, at least part of each cylindrical portion of the surface 18 is eccentric with respect to the joint axis 3 of rotor 2 and stator 1 (FIG. 7 illustrates in dot and dash lines, the section 100 by the cutting plane, of surfaces 18, such as it would appear if it were centered in 3).

Referring more particularly to FIG. 8, the centers of curvature C1, C2, C3 and C4 of the sections of the cylindrical portions of surface 18 by a plane transversal to said surface portions (in effect the cutting plane of FIG. 7) are arranged in quadrature so that each center C1, C2, C3 or C4 is situated on line A—A, B—B joining the ends of the blades 7 of stator 1, each one of which blades is adjacent to blade 7 of stator 1 of which the free end defines, with the cylindrical portion in question, a laminating passage.

Morever, the rotor 2 is provided with a filling valve 23 for filling chamber 6 with viscous fluid and a draining valve 24, each valve being disposed in diametrically opposite manner with respect to each other.

The damper according to the invention works as described hereinafter with reference to FIG. 9 which diagrammatically illustrates an application thereof to the suspension of a vehicle such as a towing vehicle.

According to FIG. 9, the damper is mounted via shaft 22 of stator 1 on the chassis 50 of a towing vehicle 51 and via an eccentric part 52 of rotor 2 on a suspension arm 53 via a rigid connecting rod 54. More specifically, the two ends of the connecting rod 54 are articulated, respectively, about a pin 55 on the eccentric part 52 and about a pin 56 on the elastic suspension arm 53 carrying one or more wheels 58 in contact with the ground 59. The ends of arm 53 are contained in two bearings 60 integral with the chassis.

If the wheel 58 meets up with an obstacle, such as a bump in the ground, the displacement of the wheel causes that of the suspension arm 53 and of the connecting rod 54 through the axial connection 56, this causing, via axial connection 55, the rotation of the rotor 2 about pin 3 in the clockwise direction as indicated by the arrow in FIG. 9.

The viscous fluid is then transferred from each volume 15a defined by one blade 14 of rotor 2 and the side 11 of the corresponding blade 7 of stator 1, towards the volume 15b defined by the side 10 of the blade 7 of stator 1 and the blade 14 of rotor 2 adjacent to said side 10 of the blade. The fluid is transferred through each laminating passage 19, said fluid being thus slowed down between the different volumes 15a, 15b while the energy produced by the shock is absorbed.

Since the cross-sectional surface of each laminating passage 19 decreases as the rotor 2 rotates, the laminating of the viscous fluid, and as a result the slowing down thereof, becomes more important when the rotation in the damping direction of rotor 2 is greater.

When the wheel has gone over an obstacle, rotor 2 then moves in the clockwise direction and the fluid is transferred from volume 15b towards volume 15a with a laminating passage section 19 which increases with the angular displacement, this causing a damping which decreases with the stroke. The opposite effect could also be obtained, namely a greater damping on release of the suspension, for example by placing the cylindrical portions of surfaces 18 included between two blades of rotor 2, in such a way that each laminating passage 19 increases when the rotor turns in anti-clockwise direction.

What is claimed is:

1. A rotary damper, of the type comprising a stator and a rotor defining between them a main chamber filled with a fluid, at least substantially radial blades being disposed on each of said stator and rotor, said blades disposed in the stator, respectively on the rotor, dividing said main chamber into a plurality of volumes, and the free ends of the blades disposed on the rotor, respectively of the stator, defining laminating passages in cooperation with portions, in facing relationship, of the surface included between two blades of the stator, respectively of the rotor, said damper further comprising an auxiliary chamber which communicates with said main chamber and which is formed by at least an enclosure defined between one of the extreme faces of said damper and an elastically deformable diaphragm associated to said extreme face, said elastically deformable diaphragm being sealingly fixed both to said rotor and to said stator.

2. A damper as claimed in claim 1 wherein said auxiliary chamber is formed by two enclosures, each one of which is defined between one of said extreme faces of said damper and an elastically deformable diaphragm associated to the corresponding extreme face.

3. A damper as claimed in claim 1 wherein one of said extreme faces associated to a diaphragm is constituted of two discs respectively associated to said rotor and to said stator, and wherein a communication passage between the main chamber and the auxiliary chamber is formed by a clearance provided between said discs.

4. A damper as claimed in claim 3 wherein an external and an internal annular peripheries of the diaphragm are encircled by an internal ring and an external ring.

5. A damper as claimed in claim 4 wherein said diaphragm is secured by vulcanization to its respective external and internal rings.

6. A damper as claimed in claim 4 wherein said diaphragm thus encircled by said external and internal rings, is housed in a corresponding annular groove defined by said discs.

7. A rotary member as claimed in claim 1 wherein said diaphragm of one auxiliary chamber is annular-shaped.

8. A damper as claimed in claim 1 wherein the cross-sectional area of each laminating passage is variable as a function of the relative rotation between said rotor and said stator.

9. A damper as claimed in claim 1 in which said stator and rotor are co-axial, wherein at least part of each portion of said surface is cylindrical and eccentric with respect to the common axis of said rotor and stator.

10. A damper as claimed in claim 9 wherein sections of said cylindrical portions of said surface are formed by a plane transversal to said portions of surface and wherein the centers of curvature of said sections are situated on a circle, of which the center belongs to the common axis of said rotor and stator, said centers being regularly spaced out on said circle.

11. A damper as claimed in claim 10 comprising four blades disposed on the stator and four blades disposed on the rotor, wherein said centers of curvature are disposed in quadrature.

12. A damper as claimed in claim 11 in which the stator is disposed inside the rotor and each laminating passage is defined between the free end of a blade situated on the stator and a cylindrical portion, in facing relationship, of the surface included between two plates of the rotor, wherein the center of curvature of the section of each cylindrical portion by a palne transversal to said portion is situated on the line joining the ends of the blades of the stator each of which are adjacent to the blade of the stator of which the free end defines, with said cylindrical portion, a laminating passage.

13. A vehicle suspension comprising at least one deformable rigid element cooperating at its two ends with bearings fast with a vehicle chassis and coupled, towards its middle part, to an axle carrying at least one wheel, wherein said suspension comprises a rotary damper, of the type comprising a stator and a rotor defining between them a main chamber filled with a fluid, at least substantially radial blades being disposed on each of said stator and rotor, said blades disposed in the stator, respectively on the rotor, dividing said main chamber into a plurality of volumes, and the free ends of the blades disposed on the rotor, respectively of the stator, defining laminating passages in cooperation with portions, in facing relationship, of the surface included between two blades of the stator, respectively of the rotor, said damper further comprising an auxiliary chamber which communicates with said main chamber and which is formed by at least an enclosure defined between one of the extreme faces of said damper and an elastically deformable diaphragm associated to said extreme face, said elastically deformable diaphragm being sealingly fixed both to said rotor and to said stator.

14. Hand-operated control comprising a control handle fast with a shaft and of which the angular displacement is representative of an output signal piloting a member, wherein said control comprises a rotary damper which is mounted on said shaft, and said rotary damper is of the type comprising a stator and a rotor defining between them a main chamber filled with a fluid, at least substantially radial blades being disposed in the stator, respectively on the rotor, dividing said main chamber into a plurality of volumes, and the free ends of the blades disposed on the rotor, respectively of the stator, defining laminating passages in cooperation with portions, in facing relationship, of the surface included between two blades of the stator, respectively of the rotor, said damper further comprising an auxiliary chamber which communicates with said main chamber and which is formed by at least an enclosure defined between one of the extreme faces of said damper and an elastically deformable diaphragm associated to said extreme face, said elastically deformable diaphragm being sealingly fixed both to said rotor and to said stator.

* * * * *